D. L. Miller,
Hay Press.

Nº 27,556.    Patented Mar. 20, 1860.

Witnesses:                                                                 Inventor:

UNITED STATES PATENT OFFICE.

DAVID L. MILLER, OF MADISON, NEW JERSEY.

IMPROVEMENT IN HAY AND COTTON PRESSES.

Specification forming part of Letters Patent No. 27,556, dated March 20, 1860.

*To all whom it may concern:*

Be it known that I, DAVID L. MILLER, of Madison, in the county of Morris and State of New Jersey, have invented a new and Improved Hay and Cotton Press; and I do hereby declare that the following is a full, clear, and exact description thereof, reference being had to the accompanying drawings, forming a part of this specification, in which—

Figure 1:
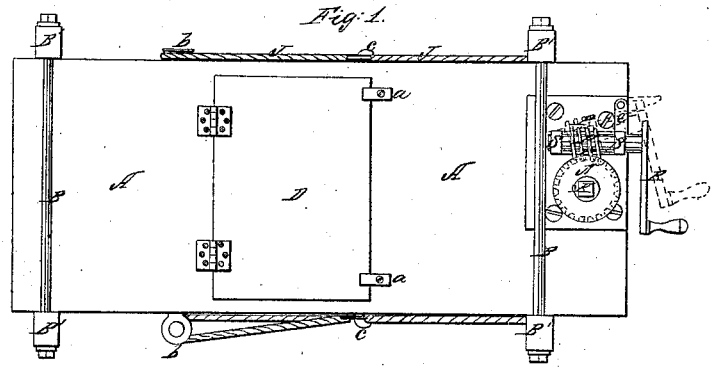
Figure 2:
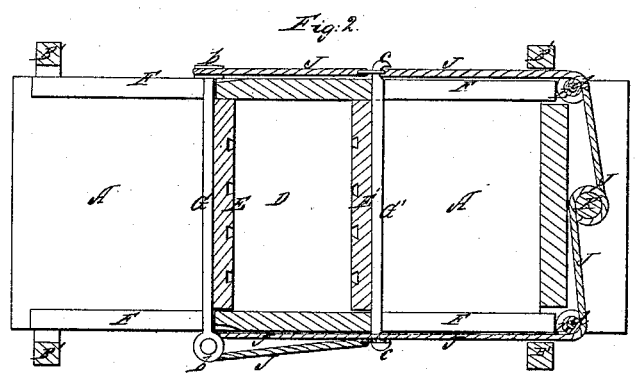
Figure 3:
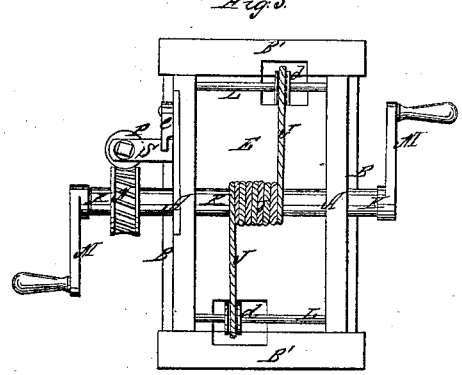

Figure 1 represents a side elevation of my press, showing the endless screw and wheel for winding up the chains, with the followers in dotted lines in their two extreme positions. Fig. 2 is a vertical longitudinal section of the press-box, showing the followers in their positions when the hay or cotton is fully pressed into a close compactness. This figure also shows the arrangement of the chains for operating the two followers with a simultaneous movement toward each other. Fig. 3 is the front end of the press, showing the arrangement of the ropes over loose pulleys around the drum, and the endless screw and wheel for operating the same.

Similar letters of reference indicate corresponding parts in the three figures.

This invention consists in combining, with an open-head press-box of a suitable size and strength to resist lateral pressure two movable followers having a simultaneous movement to or from each other, which is to be imparted to them by an arrangement of ropes or chains which are wound up in opposite directions on a shaft which is operated by a worm screw and wheel and suitable cranks or levers connected therewith. The worm-screw is to be arranged in such a manner with relation to its wheel that it can be disengaged from the wheel for drawing apart the followers after each operation of the press, the whole, when combined, forming a simple, cheap, and efficient power-press, requiring to be braced only against lateral thrust, as will be hereinafter described and represented.

To enable those skilled in the art to fully understand my invention, I will proceed to describe its construction and operation.

In the drawings, A represents a horizontal press-box with both ends open, and which is clamped at either end by brace-rods B and cross-bars B', and, if necessary, two more of these clamps may be used intermediate within the end clamps. In each side, and in the middle of this box, is a door, D, secured on one side by hinges and on the other by buttons *a*, or suitable bolts, from which doors the bales are taken after being pressed and bound.

E E' are the two pressing heads or followers, slotted in their faces to admit the straps or bands to be put round the bale and secured, and working loosely in the press-box. These followers have strong metal bars G G', secured to their backs, which pass through longitudinal central slots, F F, in the top and bottom of the box A, and on the ends of bar G are grooved pulleys *b b*, and on the ends of bar G' are hooks *c c*. Both hooks and pulleys are on the outside of the box.

J is a rope or chain which is passed through a hole in shaft K, and each end is carried over rollers or pulleys *d d*, which are free to turn on bars L L, and to receive a sliding motion over their bars. From these loose pulleys the ends of the chain are carried round pulleys *b b* of bar G of one of the pressing-heads, and from thence the ends are hooked over the ends of bar G' of the other pressing-head. Then by turning the shaft K the chain will be wound up and the followers will approach each other simultaneously, and press the hay or cotton into a compact and solid mass, which is removed, after being tied, from the door D. The pulleys *d d* have a lateral play on their shafts, whereby the chains are kept from riding and the chain is wound evenly on its shaft K. Both ends of shaft K project out from the sides of the press-box and receive crank-handles M M.

N is a worm-wheel, and P is a worm-screw which engages with this wheel. The shaft of the screw P receives on its end a crank-handle, R, which, with the assistance of the cranks, is used to draw up the followers. A very slow motion will be had, but great power can be exerted by one or two men hold of the crank R, which by the use of a worm-screw the reaction or recoil of the followers is prevented without the necessity of using pawl or ratchet for this purpose.

It is important, in view of the slow motion of the shaft K when acted upon by the worm-screw, to give a rapid motion to this shaft in withdrawing the followers after each pressing operation. Therefore I pivot one end of the bracket S for supporting the screw-shaft P securely to the press-box, so that by drawing out the latch-pin e the bracket may be raised and disengaged from the shaft K, which will then turn freely, and the bracket may be held up by the pin e, as represented in Fig. 1 in red lines.

The operation of this press is as follows: The followers are drawn apart by disengaging the screw P, as described, and the chain loosened from the pulleys attached to follower E. When this follower is removed from the box, and with the door D closed, the hay is packed into the press-box and the box filled. The follower is then replaced in the box and the chains placed over the pulleys d d, as before. The screw-shaft is then brought into gear with its wheel N and locked down by latch e. The chains are then wound upon shaft K, and the followers E E will forcibly approach each other and press the mass of hay or cotton as compactly as desired. When the doors are opened and the bale is bound and secured, the followers are drawn back, and the bale can be removed from either door.

I do not desire to claim any of the parts forming my improved press separately or irrespective of their arrangements and combination; but What I do claim, and desire to secure by Letters Patent, is—

The combination, with the press-box A, of the two followers E E', with their stripping-bars G G', rollers b b, and hooks c c, pulleys d d, working loose on their shafts L, shaft K, and worm-wheel and worm-shaft N P, the latter being hung in a pivoted bracket, and operated as set forth, when these several parts are all arranged as and for the purposes described and represented.

DAVID L. MILLER.

Witnesses:
M. M. LIVINGSTON,
B. GIRONDE.